United States Patent [19]

Lerner

[11] E Patent Number: Re. 33,444

[45] Reissued Date of Patent: Nov. 20, 1990

[54] FLUID TREATING FOR REMOVAL OF COMPONENTS OR FOR TRANSFER OF HEAT, MOMENTUM-APPARATUS AND METHOD

[76] Inventor: Bernard J. Lerner, 747 Orchard Hill Dr., Pittsburgh, Pa. 15238

[21] Appl. No.: 230,878

[22] Filed: Aug. 11, 1988

Related U.S. Patent Documents

Reissue of:

[64] Patent No.: 4,732,585
Issued: Mar. 22, 1988
Appl. No.: 842,203
Filed: Mar. 21, 1986

U.S. Applications:

[63] Continuation-in-part of Ser. No. 569,270, Jan. 9, 1984, abandoned.

[51] Int. Cl.[5] ..... B01D 47/14

[52] U.S. Cl. ..... 55/90; 55/257.1; 55/259; 55/443; 55/444; 165/159; 165/172; 210/150; 261/94; 261/108; 261/114.1; 261/153; 261/154; 261/DIG. 9; 366/338

[58] Field of Search ..... 261/94, 96, 108, 109, 261/114.1, 121.1, 122–124, 153–155, DIG. 9; 55/80, 83, 84, 97, 90, 226, 259, 443, 444, 257.1; 210/150, 758; 366/336–340; 165/159, 172

[56] References Cited

U.S. PATENT DOCUMENTS

| | | | |
|---|---|---|---|
| 661,944 | 11/1900 | Belden | 55/444 X |
| 722,272 | 3/1903 | Baker | 55/444 X |
| 877,460 | 1/1908 | Brunner et al. | 261/109 X |
| 1,603,878 | 10/1926 | Smith | 55/444 X |
| 3,447,287 | 6/1969 | Andersen | 55/259 X |
| 3,472,315 | 10/1969 | Stoker | 165/159 X |
| 3,600,792 | 8/1971 | Valluy et al. | 165/172 X |
| 3,795,486 | 3/1974 | Ekman | 261/115 X |
| 4,060,399 | 11/1977 | Gleason | 261/114.1 X |
| 4,143,709 | 3/1979 | Cunningham | 165/172 |
| 4,434,112 | 2/1984 | Pollock | 261/153 |

FOREIGN PATENT DOCUMENTS

| | | | |
|---|---|---|---|
| 241225 | 10/1962 | Australia | 165/172 |
| 531515 | 1/1922 | France . | |
| 52-96973 | 8/1977 | Japan . | |
| 562593 | 7/1944 | United Kingdom . | |
| 897417 | 5/1962 | United Kingdom . | |
| 1594524 | 7/1981 | United Kingdom . | |

*Primary Examiner*—Richard L. Chiesa
*Attorney, Agent, or Firm*—Hymen Diamond

[57] ABSTRACT

Apparatus for treating fluids flowing at high velocity, for mass and heat transfer, for gas-liquid contacting and for contaminant particulate, mist or fume separation, including a plurality of perforated or unperforated cylinders arrayed staggered in rows perpendicular to the direction of flow of the fluid. The elements are spatially separated from each other. Diagonal by-pass flow through the array is blocked by a partition extending from each element generally parallel to the direction of flow of fluid bisecting the space between a pair of elements of an adjacent row with the elements of the pair symmetrically spaced with respect to the partition.

Also, a method of removing contaminants from gas by passing the gas through this array between and injecting a liquid into the array. Capture of the contaminants by the drops is effected because of the difference in acceleration of each as the contaminated gas passes in and out of the gap between each cylinder and its adjacent partitions.

Also, mass interchange between a gas transmitted upwardly through the array and liquid injected into the gas. Stable dynamic bubbling within perforated cylinders of the array takes place producing the interchange. After the gas passes through an array, it is expanded so that its velocity is reduced and it sheds drops of liquid.

21 Claims, 9 Drawing Sheets

FIG.2
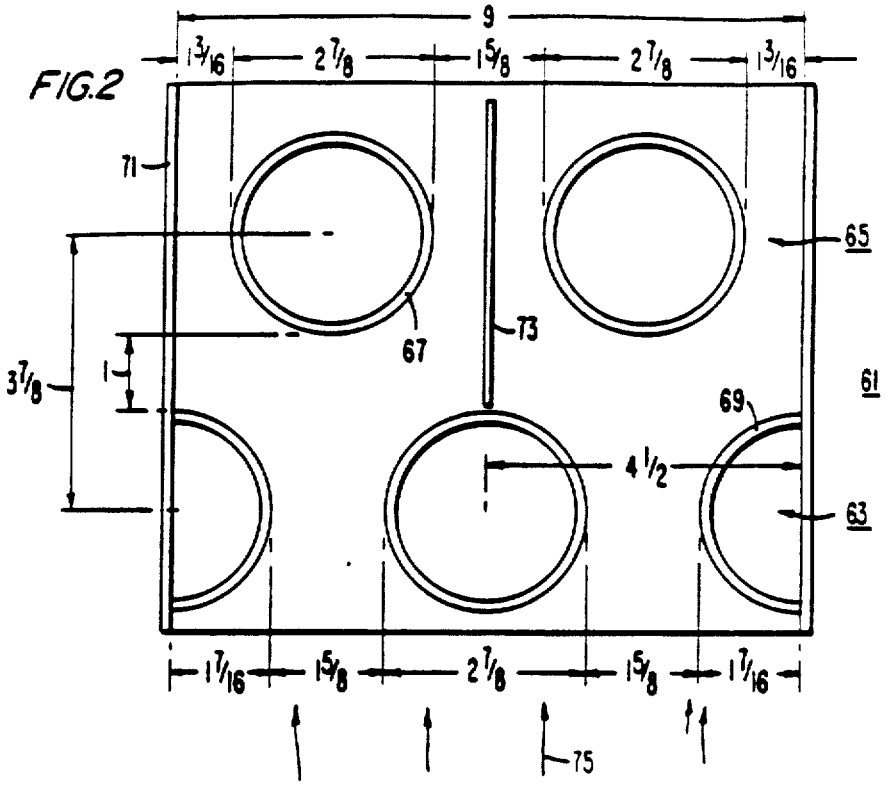
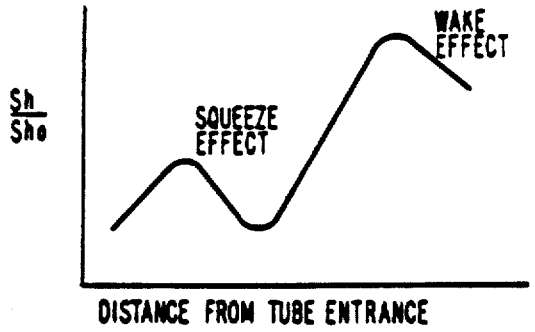
FIG.4

MANOMETER
PITOT
185
183
187
162
175
173
189
169
167
165
164
171
177
179
181
3 3/4
2 3/8
2 1/8
1 5/16

301
305
303
307
317
8".50
4"
4"
8"
8"
8"
8"
24 3/8" O.D.
II
II 343
328
341
361
363
362
365
339
357
359
355
367
327
337
335
319
301
303
353
325
333
305
331
315
351
329
323
321
332
20"
14"
1½"
28"
13"
6½"
5½"
13' 6½"
7' 7"

FLUID TREATING FOR REMOVAL OF COMPONENTS OR FOR TRANSFER OF HEAT, MOMENTUM-APPARATUS AND METHOD

Matter enclosed in heavy brackets [ ] appears in the original patent but forms no part of this reissue specification; matter printed in italics indicates the additions made by reissue.

REFERENCE TO RELATED APPLICATION

This application is a continuation-in-part of application Ser. No. 06/569,270, filed Jan. 9, 1984 for FLUID TREATING, and now abandoned.

*This application is a reissue of application Ser. No. 842,203, filed Mar. 21, 1986, now U.S. Pat. No. 4,732,585.*

BACKGROUND OF THE INVENTION

This invention relates to the processing or treatment of fluids in such operation as mass transfer, heat transfer in heat exchangers, liquid-gas contacting, and separation of contaminant particulate, mist and fumes from gases. This invention has particular relationship to such treatment of fluids with an array of sets of elements in rows with elements in any row being staggered with respect to the elements in adjacent rows.

An array of such elements may be used as a separate unit, or a plurality of arrays may be disposed in series in a tower which serves for mass transfer between a gas and a liquid. The word "element" as used in this application means an element, usually an elongated element, of any transverse cross-sectional shape. The word "element" includes within its meaning cylindrical elements which are hollow or solid such as tubes or rods. Cylindrical elements have advantages in the treatment of fluids. The word "cylindrical" is used here in its broad sense. A cylinder is defined as a three-dimensional surface formed by tracing a plane continuous closed curve with a line perpendicular to the plane of the curve.

Staggered tubular arrays have been used for various industrial purposes. For example, in cross-flow heat exchangers, fluid to be heated or cooled flows perpendicularly to a staggered-tube array in which the tubes are arranged in a triangular pitch or rotated-square array. Typical values of tube pitch for common heat-exchanger tube layouts are given on pages 10–26 of Chapter 10, "Thermal Design of Heat-Transfer Equipment", in Perry's Chemical Engineers' Handbook, 5th Edition, McGraw-Hill (New York). Similar staggered tube or rod arrays have also been employed for gas cleaning and mass transfer.

Gas demisting and particulate-removal applications of arrays of cylindrical impingement rods of elliptical and streamlined transverse cross-section are described in British Pat. Nos., Talboys 562,593, General Dynamics 897,417 and Lerner 1,594,524. British Pat. No. 644,391 describes a particulate filter comprising a staggered array of elements of streamlined transverse cross-sectional shape fabricated from perforated sheet or gauze. Talboys discloses an array of spaced parallel tubes for removing dust and impurities from air in which the tubes are perforated or foraminous and are covered with sleeves of woven cloth which are kept wetted with oil. These tubes are of cylindrical or elliptical transverse cross-section. General Dynamics discloses a mist-eliminator array of impingement rods of streamlined transverse cross-section covered with a water-absorbant material. Lerner describes the application of a staggered array of fibrous cylinders for gas absorption, mist and particulate removal. Andersen, in U.S. Pat. No. 3,447,287, discloses an incinerator scrubber containing a horizontal array of staggered rows of porous refractory cylindrical impingement piers oriented perpendicularly to the path of gas flow. Ekman, in U.S. Pat. No. 3,795,486, describes a wet scrubber comprising a horizontal array of rod-like elements for absorbing sulfur oxides. Staggered arrays of other types are shown in Heenan & Froude, French Pat. No. 531,515. The instant invention concerns itself with, and is applicable to, the arrays disclosed in the above-described patents and literature which are typical of the prior art.

In most, if not all, of the above-described applications of staggered arrays of elements, the elements in the rows are spatially separated from each other and from the elements of the adjacent rows so that open flow space completely surrounds each element. A disadvantage of the prior-art staggered arrays is that they are not fully effective or efficient in the treatment or processing of the fluids which are passed through them. Heretofore, the cause of this deficiency in effectiveness and efficiency has not been realized or known. Staggered element arrays are usually so arranged that from the fluid approach point, or direction perpendicular to the array, the fluid "sees" nothing but element surface, i.e., there is no open, unobstructed flow area on a projected view. The conventional wisdom on which such an arrangement is based is that all fluid will impinge on, flow around, and contact each element. While this is the desired and desirable objective, it has not been realized in the prior-art open array arrangement of elements.

It is an object of this invention to overcome the disadvantages of the above-described prior art and to provide treatment or processing apparatus for fluids, including a staggered array of elements, in whose use the treatment shall be effectively and efficiently carried out.

SUMMARY OF THE INVENTION

This invention arises from the discovery that in prior-art arrays, there are open by-pass paths for the fluids to be treated between the elements. These by-pass paths are along the diagonals of the array, i.e., they are at an acute angle to the downstream direction of fluid flow. These by-pass paths offer minimum flow resistance to the fluids as compared to the alternate paths in which the fluid is incident on the elements and a significant portion of the total fluid bypasses through these open diagonal channels. In Heenan & Froude, the by-pass paths are blocked by elements such as are shown in its FIG. 6. However, this is achieved by closely spacing channel-shaped elements in high-flow resistance relationship. Not only is any potential by-pass flow blocked, but the flow as a whole is blocked so that the pressure drop in a fluid passing through the array is high, imposing an economic penalty which is not acceptable. This is particularly true for fluids flowing at a high velocity, e.g., gases at 500 to 2,000 feet/minute, so that high flow-resistance apparatus such as those disclosed by Heenan & Froude, at best, are economically limited to applications where the velocities are in the low ranges, substantially below 500 feet per minute for gases.

In accordance with this invention, the by-pass flow is suppressed by partitions extending from or between the elements of a staggered array for treating or processing a fluid. [As has been stated,] *To* achieve the desired low resistance, each partition is positioned so that its surfaces are generally parallel to the direction of flow. These surfaces may be planar or curvilinear, for example, corrugated; planar surfaces are preferred. Each partition is also thin compared to the spacing between the outer surfaces of the elements between which the partition passes. Typically, the partition thickness is between 5 and 25% of this spacing and is preferably 5 to 15%. The partitions extend substantially along the whole length of the elements. A partition may extend from each of the elements of the array or from a sufficient number of elements of the array to reduce the by-pass flow sufficiently to render the array effective and efficient in processing or treating the fluid. The reference in a claim of this application to the presence of partitions between pairs of elements of a straggered array means that the partitions need not be present between all pairs of elements, but only between a sufficient number of pairs for effective treatment of the fluid. Each partition usually bridges between two elements of alternate rows of the array but where there are only two rows the partitions extend from the elements of only one row. A row is defined as a line or an array of elements generally perpendicular or transverse to the direction of flow of the fluid. It is desirable that each partition should be positioned so that the elements of the intervening row between which it passes are symmetrically spaced, i.e., the distances between the longitudinal center plane of a partition and the centers of the elements between which it passes should be substantially equal. This symmetry is desirable so that the minimum flow areas in the direction of the flow on each side of the partition are substantially equal. If these areas are unequal, the greater area will conduct more fluid-flow and the processing of the fluid is not uniform. Where there are more than two rows, each partition extends between elements in alternate rows. Each partition need not be joined, for example by welding, to the elements which it bridges; however, it may be joined to one or both of these elements, but the partitions must be so arranged, or so positionally or spatially related to the elements as to suppress diagonal flow effectively. For example, in the case of heat transfer, it is desirable that the partition be joined to both elements which it bridges. Each partition may also be independently supported from the structure which houses or supports the array. The heart of this invention is in the provision of partitions to suppress the diagonal flow effectively and any arrangement of partitions which follows the teachings of this invention to suppress diagonal flow is within the scope of equivalents of this invention.

While the elements in the rows of the array may have transverse cross-sectional shapes of different form, for example, such as are disclosed in Heenan & Froude, staggered arrays with cylindrical elements have the marked advantage that they impose lower fluid-flow pressure drop. In addition, arrays with cylindrical elements are more frequently encountered than arrays of other types. In industrial operations such as heat transfer, the elements of the arrays are inherently cylindrical tubes.

A surprising phenomenon, with potential for great utility, has been discovered in conducting research with apparatus including an array of rows of perforated horizontal tubes in which partitions are interposed in accordance with this invention. The word "perforated" is used here and throughout this application in its general meaning to including tubes with perforations of any type. The tubes may be composed of foraminous material such as wire mesh, or they may be composed of other appropriate porous material; [a semi-colon] they [maybe] *may be* perforated tubes composed of metal or plastic. It has been found that when gas and liquid are conducted through such an array with the gas flowing vertically upwardly, at at least a predetermined velocity, a dynamically stable pool of the liquid is formed within each tube. It has been discovered that the gas bubbles through this pool. Based on this phenomenon, apparatus and a method have been created in accordance with this invention for mass transfer between a gas and a liquid.

The liquid accumulates predominantly within the perforated tubes of an array according to this invention because of the pressure differential induced across the tubes by the gas upflow through the array. In addition, liquid is retained within the tubes because of direct frictional drag exerted by the gas on the liquid and momentum exchange between the gas and the liquid Earlier work on the bubbler is described in the parent of this application and carried over into this application. With the apparatus with which this earlier work was carried out, it was observed that at 790 feet per minute gas velocity, liquid partially filled the perforated tubes and light, intermittent bubbling began in the top tubes and extended rapidly to the other tubes. Above 1,450 f.p.m., the bubbling action in the tubes decreased and entrainment of spray became heavy. These observations define the operating range of gas velocities which yield dynamically stable bubbling contact within the perforated tubes for an air-water system, as between 790 f.p.m. and 1,450 f.p.m. For other gases and liquids, the range would be different.

It is important to note that the gas velocities, 790 f.p.m. to 1,450 f.p.m. are "superficial" gas velocities, i.e., velocities based on the empty, transverse, free cross-sectional area of the array or module with which the work was carried out and through which the air and water flow took place. It is also important to note that, for Example III, described in the parent application and in this application, the bubbler module had a transverse cross-section of 9 inches by 11 inches and that the column through which the fluids passed into and out of the array had the same dimensions and the array occupied the full cross-sectional area of the channel. The heavy liquid entrainment in the upwardly flowing gas, observed at the high gas velocities, was considered a limiting factor. This entrainment was confined to the 9-inch by 11-inch channel and had no escape route other than up or down.

In the early work, the water entrainment was permitted to reflux countercurrent to air flow in the same confined transverse cross-sectional area through which the air flowed upwardly. At high velocities the liquid accumulated on the walls of the channel at so high a rate that it could not drain off as rapidly as it accumulated and flooding occurred. In accordance with an aspect of this invention, the liquid carry-over is provided with escape routes out of the gas flow path which induces the carry-over. This is accomplished by providing a containing shell having a transverse cross-sectional area greater than the transverse cross-sectional area of the modular bubbler array. The modular bubbler array, in which the bubbling takes place predominantly within the tubes, according to this aspect of the invention, is essentially a walled housing open at both ends, supported from (or appended to) a horizontal plate or tray of substantially greater transverse area than the housing of the array. In its practice, this aspect of the invention may be applied to an individual array or module or to a tower in which modules are arranged serially in a generally vertical array and the mass interchange takes place in successive modules.

In the practice of this aspect of the invention, the flow area above the array or module is greater than the flow area within the module. The velocity of the gas expanding into this upper area decreases, causing liquid to drop out of the gas stream. Additionally, the radial vector of the gas expansion direction conveys the liquid carry-over radially outwardly. The liquid which drops out of the conveying gas stream is collected on the horizontal surface of the sheet external to the confined array, and, in a tower in which the modules are vertically arranged in series, is conducted by downcomers to a lower module, or in case a single module or the lowermost module of a series in a tower, to a storage sump. This aspect of the invention lends itself readily to an efficient multi-stage liquid-gas contactor. A significant advantage of this aspect of the invention is a gas velocity range which is several times that allowed in conventional sieve or bubble-cap tray columns or towers.

In accordance with this aspect of the invention, there is provided, in addition to the module described above of an array of perforated tubes with partitions for suppressing diagonal flow, a tower including a vertical array or stack of such modules. The transverse cross-sectional dimension of the tower is substantially greater than the dimensions of the transverse cross-section of the container of the array. The tower has a lower inlet and an upper outlet for gas and within the tower there may be liquid spray nozzles. The liquid spray nozzles may be above all or some of the modules to spray the liquid countercurrent to the gas or below all or some modules to spray the liquid cocurrent with the gas or both above and below all or some of the modules.

The spray nozzles between bubbler modules of a series vertical modular bubbler array may be omitted and the liquid may be supplied by a spray above the upper contact module. In accordance with a further aspect of this invention, the spray nozzles are omitted entirely and the liquid for liquid-gas interchange is fed into a series vertical array of modular bubblers in a stream above the upper bubbler. The liquid flows downwardly in a stream. As it encounters each modular bubbler in the vertical series array in its turn, the gas bubbles through the liquid predominantly within the tubes of the bubbler.

The arrays in accordance with this invention have an advantage in addition to the advantage that they suppress by-pass flow. The eddies formed in the wake of the fluid flowing between each element and the partitions on each side of it, enhance the rate for mass transfer to and from the wetted surfaces of the partitions and the elements. The enhancement is partially achieved by a modified venturi effect which occurs in the fluid as it passes between the partitions and adjacent elements as will now be described.

In addition to the discover of the bubbling-flow liquid-gas contactor in which the liquid bubbles predominantly within the tubes, it has also been discovered that the array of this invention has unique properties when used as a modified venturi scrubber for particulate removal. In this aspect of the invention, the cylindrical tubes of the array may be either perforated or solid, and the preferred fluid flow is concurrent liquid and gas flow. The gas rate may vary in the range of 1000 to 20,000 feet per minute, and the liquid/gas ratio range is the same as those employed in more conventional venturis. In both laboratory and field test work, it has surprisingly been discovered that the efficiency of a venturi particulate scrubber employing the array of this invention as the venturi throat section, as described in Example II, below, yields greater particulate removal efficiencies than a conventional venturi operating at equal gas pressure drop, i.e., equal energy consumptions. As far as is known, this appears to be the first instance of a modification or "obstruction" of venturi throat flow that offers a positive efficiency/energy consumption benefit ratio as compared to the conventional unobstructed simple venturi throat.

Another advantage of the use of the array of this invention as a venturi contactor is that the venturi flow constrictions are contained within the array itself. That is, it is not necessary to have a converging approach section or diverging exhaust section, which are difficult and expensive to fabricate. By distributing the gas flow over multiple parallel flow acceleration paths and causing a number of repeated venturi flow accelerations and deccelerations in the course of a single traverse, the array of this invention achieves at low energy inputs the particulate-removal efficiencies of conventional high-energy venturis.

In other aspects of this invention which do not require bubble contacting in the interior of the tubular elements, the elements of the modules may be solid or tubular with the external surface covered with filamentary materials such as cloth. This form of the elements has advantages in applications such as mist elmination or particulate removal, in that inertial removal mechanisms are combined with filtration in effecting particle or drop removal in flow through the array. Solid tubular elements may also be used in applications involving scaling or plugging deposits which would close off foraminous or filamentary elements. In general, the apparatus is effective for a wide range of fluid velocities of from 500 to 2500 feet per minute for conventional particulate and mist removal and/or mass transfer applications, and from 1000 to 20,000 feet per minute in the modified venturi aspect for the removal of aerosols, fume and very fine particulates.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 2 is a plan view of a staggered array of fuid-treating apparatus showing a modification of this invention;

FIG. 4 is a graph which, in connection with FIG. 3, aids in the understanding of the manner in which the rate of mass transfer is increased in the practice of this invention;

The dimensions shown in, or described in connection with, FIGS. 1, 2, 5, [6,] *7*, 10, 11 and 12 are included only for the purpose of aiding those skilled in the art in practicing this invention and not with any intention of in any way limiting this invention.

DETAILED DESCRIPTION OF EMBODIMENTS

Figure 1:
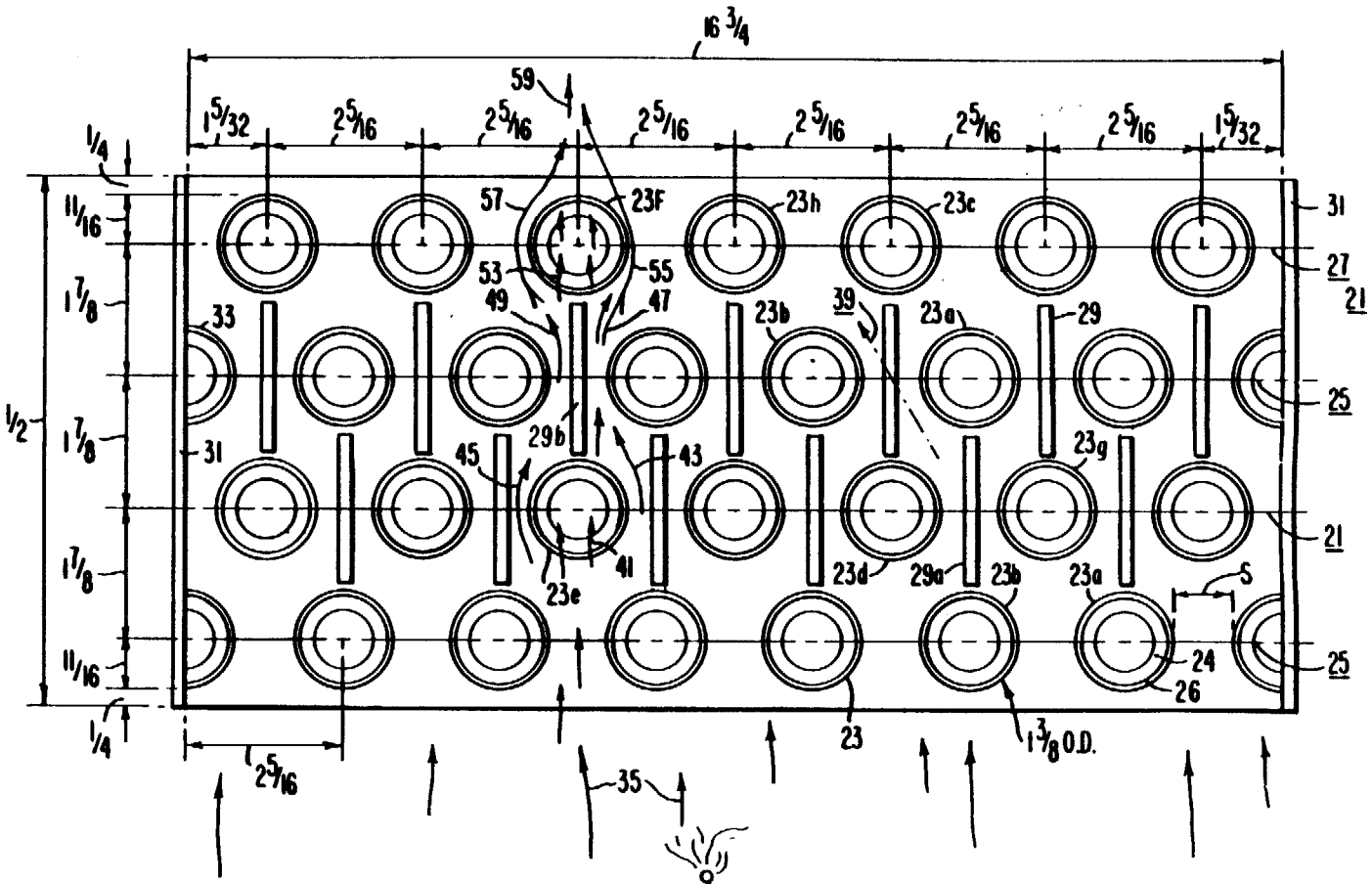
FIG. 1 is a plan view of a staggered array of fluid-treating or processing apparatus showing an embodiment of this invention.

The apparatus shown in FIG. 1 includes a staggered array 21 of cylinders 23. Typically, each cylinder 23 includes a shell 24 supporting a cylindrical-layer 26 of knitted mesh typically of polypropylene or stainless steel. Typically, the length of the cylinders 23 may be between ½-foot and 5-feet. The array 21 includes a plurality of rows 25 and 27 of the cylinders 23, the rows 25 alternating with the rows 27. The cylinders 23 of rows 25 are staggered with respect to the cylinders of the rows 27. The cylinders 23 are generally uniformly spaced or distributed over the array, i.e., the spacing between the centers of adjacent cylinders 23 in each row 25 and 27 are substantially equal and the spacings between the lines through the centers of the cylinders of adjacent rows 25 and 27 are substantially the same and the lines between the centers of cylinders in alternate rows 25 and 27 substantially bisect the lines between the centers of the adjacent cylinders 23 of the intervening rows 27 or 25. Partitions 29 extend or bridge between the cylinders 23 of alternate rows 25—25 and 27—27. Typically, the partitions 29 are composed of thin sheets of metal or plastic, typically polypropylene. The partitions 29 extend substantially along the whole length or heighth of the cylinders 23. Each partition 29 has a thickness which is small compared to the minimum distance or spacing between the outer surfaces of the pair of cylinders of the row intervening between the alternate rows whose cylinders the partition bridges. Typically, the thickness of the partition is about 5 to 25% and preferably 5 to 15% of the spacing. The spacing which is compared to the thickness is the minimum spacing S of the surfaces of the cylinders 23 which face the partition.

The array 21 is mounted in a duct partially of plastic or metal. The duct is of generally rectangular transverse cross-section and has side walls 31 and top and bottom walls (not shown). Semi-cylinders 33 of rows 25 abut the side walls 31. The side walls serve as partitions between the semi-cylinders 33.

The fluid being processed flows through the duct and the array 21 in the direction of the arrow 35 generally perpendicularly to the rows 25 and 27. With the cylinders 23 in the rows 25 and 27 spaced as shown in FIG. 1, the fluid sees a solid wall formed of the cylindrical surfaces. Typically, the fluid may be air or other gas containing a contaminant which it is desired to remove. The contaminant may be a hazardous gas or particulate matter. Typically, liquid, usually water, is sprayed into the gas by appropriately positioned spray nozzles 37.

The partitions 29 are interposed in the diagonal by-pass paths 39 which exist between adjacent cylinders 23 along the successive rows; e.g., between cylinders 23a–23b of rows 25 and 23c–[23d] *23h* of rows 27. The partitions suppress by-pass flow. The partitions have plane surfaces generally parallel to the direction 35. It is desirable that each partition 29 be generally centered along the line between the centers of the cylinders 23 between which it extends. Under such circumstances, the adjacent cylinders 23 between which the partition passes are positioned symmetrically with respect to each partition. For example, cylinders [23c] *23a* and 23d are positioned symmetrically with respect to partition 29a.

The contaminated gas flows through and around the cylinders 23 as shown by the arrows 31, 43 and 45. Because of the symmetric spatial relationship of the partitions 29 and the cylinders 23, the streams which emerge from and pass around an upstream cylinder 23e are merged into common streams 47 and 49 flowing generally symmetrically with respect to the baffle 29b downstream from cylinder 23e. These streams 47 and 49 pass through and around the cylinder 23f downstream from cylinder 23e. This cylinder 23f being the most downstream cylinder of the array 21, the streams 53 and 55 merge into a unitary stream 59. The cylinders 23 and the partitions 29 effectuate the capture of the contaminants by the liquid from the gas and drain it together with captured liquid into a container (not shown). Because of the generally uniform distribution and the generally symmetric positioning, with respect to the partitions, of the cylinder 23, the processing of the fluid is uniform throughout the extent of the array perpendicular to the direction 35.

FIG. 2 shows an array 61 including two rows 63 and 65 of hollow cylindrical members 67 and 69. The cylindrical members 67 and 69 are typically formed of perforated metal or plastic tubing. The array 61 is mounted in a duct of metal or plastic. In one row 63, the members include a cylinder 67 flanked on each side by semi-cylinders 69 which abut the side walls 71 of the duct. The other row 65 includes the cylinders 67. Typically, the cylinders 67 and 69 are about 1 to 6 feet in length. The cylinders 67 in the row 65 are staggered with respect to the cylinders 67 and 69. A partition 73 extends from cylinder 67 of row 63 between cylinders 67 of row 65. Typically the partition 73 is composed of metal or plastic. The side walls 71 serve as partitions for the semi-cylinders 69. The partitions 73 and side walls 71 extend along the length of the members 67 and 69. The uniform spatial distribution of the members 67 and 69 and the symmetry of the cylinders 67 with respect to partition 73, described in connection with FIG. 1, is present in the array of FIG. 2. Fluid to be treated flows into the duct and the array 61 in the direction of the arrows 75 perpendicular to the rows 63 and 65.

In addition to improved effectiveness and efficiency by suppression of diagonal by-pass flow of the processed fluid, this invention yields unexpected and surprising benefits. In a study of the effect of single stationary objects placed in the fluid stream on mass transfer rates to the walls of a coaxial cylindrical tube, Koncar-Kjurdjevic and Dudukovic, American Institute of Chemical Engineers Journal, Vol. 23, p. 125 (1977) and ibid, Vol. 25, pp. 895–899 (1979), found that the wake of the stationary object (sphere or concentric disk) produced two maxima in mass transfer, as measured by the Sherwood number, Sh.

$$Sh = \frac{(k)(d)}{D},$$

where k = mass transfer coefficient, d = hydraulic radius of flow channel, and

D = diffusion coefficient.

The Sherwood number is a measure of the mass transfer to the surface from the fluid or from the surface to the fluid. It was found that the first local maximum resulted from two effects: the narrowing of the effective cross-section available for flow and velocity component perpendicular to the wall which is imparted to the fluid as it flows through the constriction. The second local maximum was the result of wake formation and its interaction with the boundary layer of fluid at the wall. Owing to the instability and separation of the wake behind the object causing the initial flow constriction, the intensity of turbulent pulsations increases in the wake causing fluid elements to penetrate into the diffusion sublayer on the wall, which leads to a rapid increase of the local Sherwood number.

These investigators, Koncar-Djurdjevic et al., found that the ratio of the downstream Sherwood number with the sphere or disk obstruction in the coaxial tube to the Sherwood number in the empty tube was, on average, greater than 1.0, and in most cases, more than 2.0. The wake effect therefore doubles normal transfer rates to (and from) the walls. Heat, mass and momentum transfer in the turbulent fluid flow regime are all governed by a common mechanism: the motion of turbulent eddies. To the extent that turbulent fluid eddy motion can be mathematically described, either by theoretical or experimental means, heat and mass transfer coefficients and frictional (momentum) losses may be derived. These fundamental relationships comprise the "analogy" between heat, mass and momentum transfer. A full review of the theoretical and experimental development of the analogy between heat, mass and momentum transfer is given by W. S. Norman, "Absorption, Distillation and Cooling Towers", John Wiley & Sons, New York, 1961, pp. 35–41. Because they are controlled by a common mechanism of eddy transfer in turbulent fluid flow, heat and mass transfer rate coefficients may be calculated, one from the other. The relationship is usually stated in terms of the dimensionless groups, the Sherwood number, Sh, for mass transfer and the Stanton number, St, for heat transfer.

A doubling of the Sherwood number by an eddy-inducing device would also result in a similar increment in the Stanton number for heat transfer. Thus, the array of this invention which incorporates the wake effect, enhances transfer rates for heat and mass by factors greater than 1.0, that is, for more than the contact area added by the bridge walls. Thus, heat exchanger arrays, partitioned according to this invention, will have, on average, twice the transfer coefficient of a unit having the same area entirely in straight wall surface with parallel fluid flow.

Figure 3:
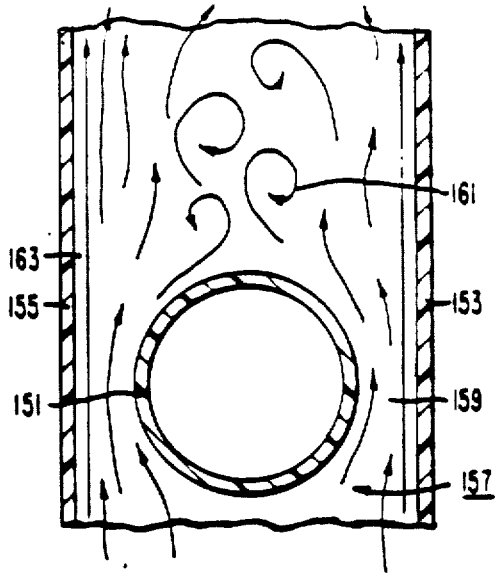
FIG. 3 is a diagrammatic fragmental view showing the manner in which the rate of mass transfer is increased in the practice of this invention.

The above-described improvements in mass transfer is illustrated in FIGS. 3 and 4. FIG. 3 shows an assembly including a tube or disk 151 positioned between walls 153 and 155. Fluid 157 is conducted through this assembly. Between the member 151 and the walls, the fluid path is constricted. The fluid 157 is squeezed into the constricted region 159 and its velocity is increased. After the fluid leaves the constricted regions 159, its velocity is reduced and eddies 161 form in its wake. The eddies 161 have a component of velocity perpendicular to the walls 153 and 155 and this component causes penetration of the layers 163 of fluid along the walls effecting mass or heat transfer.

In FIG. 4, the ratio, $Sh/Sh_o$, is plotted vertically as a function of the distance from the entrance to the assembly which is plotted horizontally. Sh is the Sherwood number of a system including the disk 151 and the walls 153 and 155 and $Sh_o$ is the Sherwood number for a system which does not include the disk 51. The resulting curve shows a maximum, corresponding to the squeeze effect and a second, higher maximum corresponding to the wake effect as labeled.

The flow through the baffled array of this invention is not identical to the case of flow through a tube past a coaxial sphere or disk, but it is a very close analog. In plan cross-section, i.e., cross-section parallel to the plan view, the array of this invention is comprised of a multiple set of parallel flow passages, [analogous to the passages between 151 and 153 and 155 and 151 (FIG. 3)] each having the same plan section as the coaxial sphere in a tube studied by Koncar-Kjurdjevic and Dudukovic. The wake effect and the walled benefits thereof are multiplied both laterally by the number of walled passages and in the fluid flow direction by the number of transverse "target" elements.

In the array of this invention, the bridging parallel partitions (29 FIG. 1 etc.) define the walls confining the flow of fluid impinging on the transverse "target" cylinders. While for both the conventional open (unpartitioned) array and the array of this invention, converging fluid flow is obtained as the fluid flows past the first row of transverse cylinders, in the open array the wake energy is dissipated as turbulent frictional losses. With the bridging partitions of this invention confining the flow through a set of two, three or more rows, (two rows 151—153, 151–155 and the third row outwardly at each cylinder) the wake energy is controlled so that eddies normal to the wall are obtained for each successive wake generation by a transverse element or element section. This raises the average transfer coefficient beyond that of the single obstruction because of the multiple, in series, repeated wake generations.

The array of this invention also serves as a fluid mixer. The nature of the array of this invention is such that the fluid stream is repeatedly split and remixed with fluid flowing in alternate flow streams as it passes in the general flow direction through the array. Thus, fluid entering between two cylinders in the first row is split into two streams by the second row cylinders and the respective first-third row partitions (29 FIG. 1 etc.). However, as fluid leaves the third row of cylinders, a different set of partition walls become effective as flow confining walls, and the two separated streams mix with two other adjacent streams. Not only is this effective for periodic mixing and redistribution in heat transfer as fluid flows through the array, but the array itself serves as an excellent static mixing device. Different gases, for example, ethylene oxide and air, or different liquids, for example, paint and solvent, may be injected upstream of the array of cylinders and thoroughly mixed as they pass through the array. In this case the fluids, gases or liquids are injected into the array 21 of FIG. 1 in the direction of the arrows 35. Usually one gas or liquid injected initially and the other or others are injected into the stream of the one injected initially. Where none of the liquids is water, the spray 37 may be omitted. The fluids may also be injected simultaneously in separate streams.

EXAMPLE I

Figure 5:
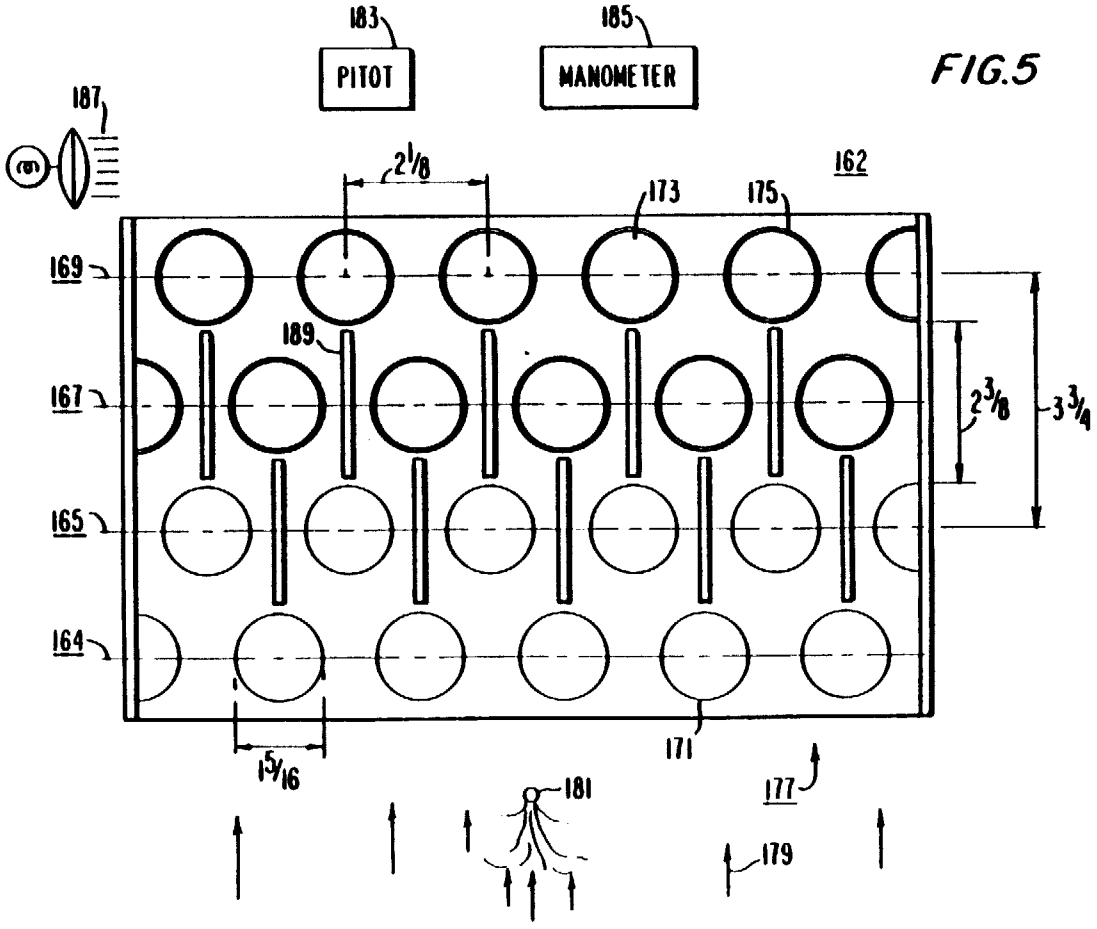
FIG. 5 is a diagrammatic *plan* view *as seen from vertically above* showing test apparatus used in investigating the treatment of fluids in the practice of this invention.

The fluid treatment of Example I was carried out with the staggered array 162 shown in FIG. 5. This array includes four rows 164, 165, 167 and 169 of vertical plastic pipe 171 and 173 staggered in a triangular pitch. Each pipe 171 and 173 has an outside diameter of 1 5/16 inches. The spacing between the centers of the pipes in alternate rows 164 and 167 and 165 and 169 is 3¾ inches. The length of the pipes is 19¼ inches. The distance between the centers of the pipes along the row is 2⅛ inches. There were 5½ pipes per row. The pipes 173 of the third and fourth rows 167 and 169 which were to be positioned downstream with respect to the flow of fluid were wrapped with a single layer 175 of thin fiberglass cloth (Hollingsworth and Vose Company, "Fibernetics" TM "Hovomat" TM) to facilitate liquid filming in accordance with the teaching of British patent, General Dynamics No. 897,417.

The array 162 was used for demisting air flowing through a horizontal duct 177 having a 12-inch by 12-inch flow cross-sectional area. Air was blown through the test duct in the direction of the arrow 179 by means of a No. 15 Cincinnati centrifugal forced-draft blower (not shown) equipped with a 7.5 horsepower motor. The duct 177 and the array 162 were located approximately 6 feet downstream of the blower. Mist was generated by means of a Beta Fog Nozzle Company Type TF6FCN spray nozzle 181 located 11 inches upstream from the test assembly. The spray nozzle 181 was operated at 100 psig to generate a well-atomized spray. At 100 psig, the nozzle flow rate was 2.2 gallons per minute, and the nozzle was pointed upstream into the air flow so that only the finer mist particles carried back to the array 162 which served as mist eliminator.

The array 162 was inserted in the duct 177 with the pipes 171 and 173 in the vertical position, and perpendicular to the air flow direction 179. The piping array was tested for pressure drop and mist elimination at varying air velocities. Air velocity was measured by means of pitot tube 183 and traverses and pressure drop across the test module by means of an inclined manometer 185. Mist penetration was visually observed by means of the Tyndall effect, using a light beam 187 normal to exit gas flow with the room darkened.

With the test array sans the partitions as taught by this invention, a fine mist penetration was immediately observed by Tyndall effect at the lowest measurable air velocity of 423 feet/minute. This fine mist loading visibly and continuously increased as the air velocity was increased to 1042 feet/minute. Large-drop penetration of 0.01–0.1-inch diameter size drops was not observed until the 700–800 feet/minute range of gas velocity. This large-drop loading also increased with air velocity increase from 750 to 1042 feet/minute. The array 162 therefore was ineffective in removing fine mist at all measured velocities down to 423 feet/minute, and was ineffective for large-drop mist removal above about 750 feet/minute.

The array 162 *without the partitions 189* was then modified to accord with the teachings of this invention. Polypropylene partitions 189, 2⅜ inches wide and ⅛-inch thick, were mounted between alternate pipes 171 and 173. The partitions 189 were centered on the center lines between the pipes 171 and 173 and extended along the length of the pipes. The array in accordance with this invention was then positioned in the duct 177 and operated as a mist eliminator at air velocities between 455 and 1140 feet/minute. Tyndall beam observation of the exhaust air showed no trace of visible fine mist penetration over the full range of velocities tested. Larger droplet regeneration did not begin until an air velocity of 1042 feet/minute and did not become significant until 1140 feet/minute, at which point the test was terminated.

The success of the partitioned array in preventing fine mist droplet penetration shown by the conventional unpartitioned array clearly demonstrates the superiority of the partition array of this invention. The elimination of diagonal channel gas bypassing by the partitions in accordance with this invention not only prevents fine mist penetration, but also elevates the air velocity at which large liquid drops first carry over. The pressure drop for the "partitioned" array was 1.35-inches water column at 1042 feet/minute air flow, as against 0.75-inches water column at the same air velocity for the unpartitioned array. Because gas pressure drop in the turbulent-flow regime is approximately proportional to the square of gas velocity, the ratio of pressure drops indicates that approximately 34 percent of the gas flow in the unpartitioned array bypasses along open diagonals at 1042 feet/minute. The incremental pressure drop obtained for the array of this invention as compared to an open unbaffled array results both from the elimination of the by-pass flow and the increase in wake turbulence intensity behind the transverse elements. These two effects are interdependent, inasmuch as blocking diagonal by-pass flow would increase the normal linear gas velocity approaching the second and consecutive rows of transverse wake-generating elements, thus causing increased wake turbulence eddying intensity. The influence of wake eddy turbulence on augmenting both drop agglomeration and impingement on the wall can be seen in the results from the above tests. It should be noted that because the liquid mist load on the test cell is a function of linear gas velocity, the large-drop reentrainment point corresponds to an abnormally high liquid load and is a liquid drainage rate limit, not an inherent efficiency limitation of the device. Because the liquid does not drain down the wall of the baffles 189 at the rate that it is deposited on the baffles, there is a surplus of liquid in the lower areas of the baffles. This liquid is reentrained by the gas and produces the drops. The true mist removal effective velocity limit of the apparatus of this invention is therefore greater than 1042 feet/minute.

EXAMPLE II

Figure 6:
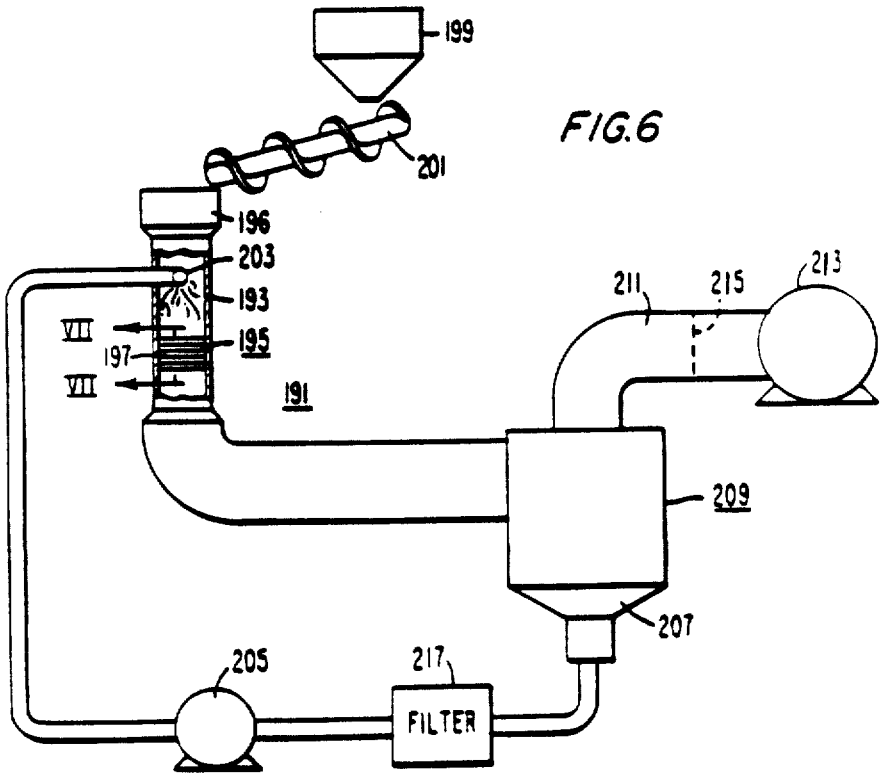
FIG. 6 is a diagrammatic view showing apparatus for removing fly-ash from a liquid in the practice of this invention.
Figure 7:
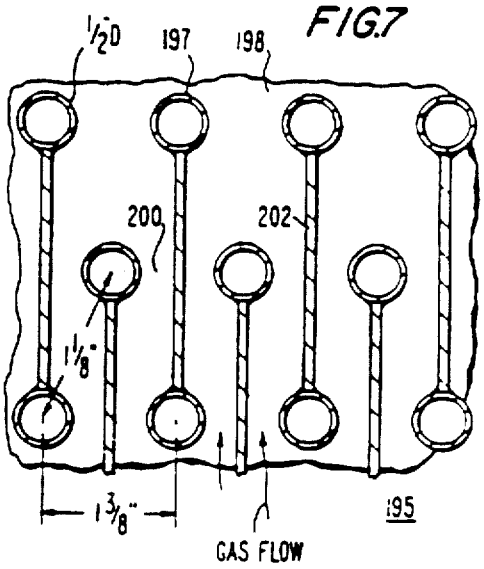
FIG. 7 is a fragmentary diagrammatic view in section taken along line VII—VII of FIG. 6 showing enlarged the array 195 which serves to produce the capture of particulate from the air.

In this example, apparatus in accordance with this invention was used for fly-ash removal from air by wet scrubbing. In this case the array according to this invention is used as a modified venturi scrubber. The apparatus 191 for carrying out this treatment is shown in FIGS. 6 and 7. This apparatus 191 includes a vertical duct 193 having a 6⅞-inch square flow cross-sectional area. A staggered triangular array 195 (FIG. 7) is interposed in this duct with a two-feet long, clear duct-run section above and below the array which constitutes a modified venturi. The top of the vertical square duct runs transitions to a 13-inch square [inch] air inlet section 196.

This array 195 (FIG. 7) includes ½-inch diameter schedule 40 steel pipe 197 positioned horizontally in the array. The length of the pipe is slightly less than 6⅞ inches. The first and third row upstream-to-downstream includes five pipes in each row; the second and fourth rows upstream-to-downstream includes a half pipe at each end and four pipes in between. The center-to-center pitch perpendicular to the axis of the duct, i.e., to the direction of fluid flow, is 1⅜ inches and the center-to-center pitch generally parallel to the axis of the duct is 1⅛ inches. The array 195 is provided with partitions 202 between the pipes of the alternate rows. The partitions are of 16 guage steel and are spot welded to the first and third and second and fourth rows of pipe centers.

Fly-ash supplied from hopper 199 was introduced into the air inlet transition 196 by means of a variable-speed screw feeder 201 at a controlled rate. At the start of the operation, a quantity of fly-ash was deposited in the hopper 199. The fly-ash rate was determined by weighing the fly-ash hopper containing fly-ash and feeder assembly 199–201 before and after a timed interval. The difference is the weight of fly-ash derived from the hopper which was fed into the apparatus. Water was introduced above the baffle array unit 195 through an impingement-jet spray nozzle 203 at a rate metered by means of a Brooks rotameter. Water was supplied by means of a Dayton centrifugal pump 205, recycling water from a slurry collection tank 207. The slurry collection tank was the bottom portion of a 24-inch diameter cyclone separator 209 placed downstream of the vertical test section and connected to receive the slurry from duct 193. The clean air exhaust from the cyclone separator 209 flowed through a 12-inch diameter duct *211* to the suction side of a Size 15 Cincinnati blower 213, equipped with a 7.5 HP, 3475 RPM motor. Filters 217 were interposed in the liquid recycle circuit. Air flow was controlled by means of a slide damper 215 on the fan suction. The blower 213 produced negative pressure in the duct so that air was induced to flow into the duct 193 vertically downwardly.

To determine the effectiveness of the modified venturi apparatus according to this invention in removing particulate from gas, the feeder 201 was set to feed fly-ash at a rate of 165.0 grams/minute and the blower 213 was set to feed the air, at 4300 feet/minute face velocity. Pressure drop across the array 195 was 7-inches water column. Water was sprayed into the air stream above the array at a rate of 7.6 gallons per minute. Pre-weighted filter cartridges 217 mounted on the recycle liquor circuit were used to filter out the fly-ash captured by the liquid and collected in the cyclone 209. The liquid recycle lines and sump 207 were rinsed with fresh water after the test, and the slurry filtered through the cartridge filters. The cartridges were dried and weighed after each run. The cartridge filters contained the fly-ash captured by the drops of water from the air sucked through the duct 193. This air initially contained the fly-ash. The total weight of fly-ash collected from the liquor system was then compared with the difference in fly-ash weight of the dry feeder and tank. Two consecutive runs made under the same conditions gave an average weight recovery of 98.2%. Inasmuch as the fly-ash samples used in these tests were collected in an electrostatic precipitator at a Duquesne Light Company coal-fired power plant in Pittsburgh, the fly-ash is representative of that normally emitted by a coal-fired utility. The efficiency level of 98.2% obtained in these tests for the removal of this ash from the air is typical of performance of a venturi scrubber operating at much higher pressure drop (and velocities) on fly-ash. The energy efficiency of this invention for particulate removal is thus seen to be uniquely high.

The scrubber of this aspect of the invention is essentially a modified venturi scrubber. The high efficiency achieved by this invention for particulate removal, may be explained as follows: Water in the form of mist or spray is introduced upstream of the array 195. The gas containing solid particulates and water droplets is accelerated to a high velocity as it enters the constricted areas 198 between the first row of transverse pipes 197. This is essentially a modified venturi effect. The gas and the contained fine particulate undergoes a rapid increase in velocity in the constricted regions 200 between the pipes and the partitions 202, but the water droplets, because of their larger mass, gain velocity more slowly. Because of the difference in velocity, there are collisions between the fly-ash particles and water droplets, with the result that the fly-ash particles are captured by the water droplets. This is not a complete process and (uncollided) water drops and uncaptured particulates pass on downstream of the first row of the array.

Immediately downstream of the first-row flow area constriction, the flow area enlarges, the gas is decelerated, and the above-described process is reversed, with the gas and contained particles losing velocity more rapidly than the water droplets. In addition, a portion of the gas flows in random turbulent eddies in the downstream wake of the pipes 197, possessing high-velocity vector components normal to the adjacent partition. The vector components normal to the partition cause penetration through the fluid boundary layers at the partition, enhancing impingement and fluid transport normal to the partition. The second row of pipes 197 again forms a gas-accelerating constricted flow area, and the above venturi process repeats itself.

Additional advantages in gas-liquid contacting may be secured by use of transverse pipes 197 that are foraminous or perforated. For example, the cylindrical mesh elements of Lerner disclosed in British Pat. No. 1,594,524, or the porous ceramic elements of Andersen, U.S. Pat. No. 3,447,287, or the perforated tubes of British Pat. No. 644,391, may be employed as transverse pipes. Heat addition to, or removal from, a fluid can also be accomplished in the array of this invention in which the transverse elements 197 are tubular heating or cooling exhanger pipes.

EXAMPLE III

Figure 8:
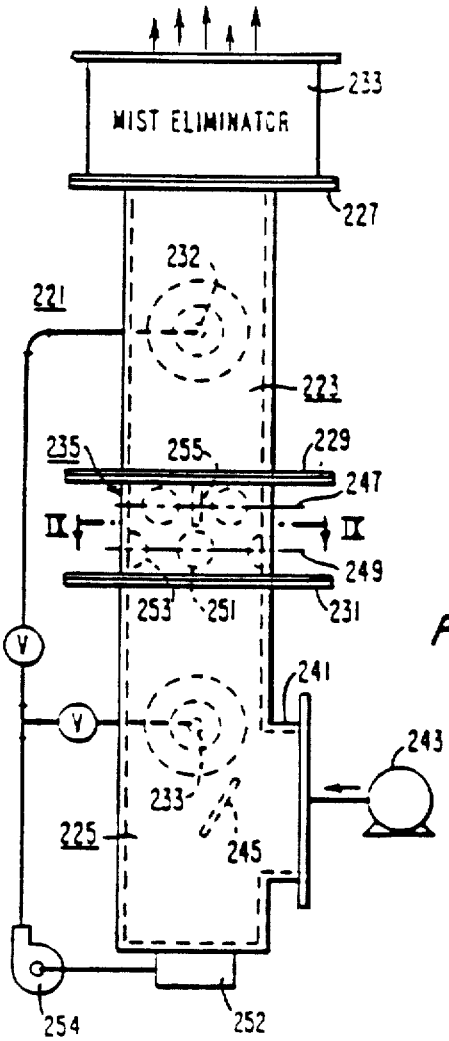
FIG. 8 is a view in side elevation of a perforated-tube bubbler-scrubber in accordance with this invention.
Figure 9:
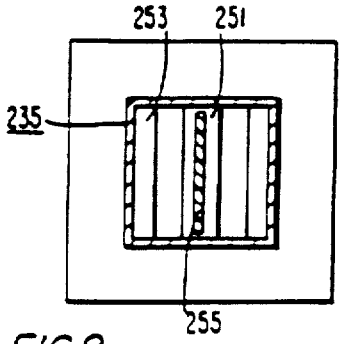
FIG. 9 is a view in section taken along line IX—IX of FIG. 8.

The efficacy of this invention for use in gas-liquid contacting was investigated. The simplest form of array, a 2-row transverse element array, such as is shown in FIG. 2, was employed. While it is preferable in the arrays of this invention that the bridging partitions run between alternate rows of transverse elements, in a simple 2-row assembly, transverse elements cannot all be bridged to downstream elements. In this case, alternate rows having two transverse elements in line may be bridged, and front-row elements without downstream partners may nevertheless be equipped with partition walls, securing the same flow advantages for the assembly. The apparatus 221 for carrying out this investigation is shown in FIGS. 8 and 9. This apparatus includes upper and lower vertical duct sections 223 and 225 of generally rectangular transverse cross-section. The upper section 223 is provided with flanges 227 and 229 at the top and bottom. The lower section 225 is provided with a flang 231 at the top. A mist eliminator 233 is mounted and secured to the flange 227. A staggered array 235 in accordance with this invention is secured between the flanges 229 and 231. Spray nozzles 232 and 233 are mounted in the sections 223 and 225 above and below the array 235. The lower section 225 is provided with a horizontal tee 241 through which air is injected by a blower 243. The air is distributed by a buffle 245 in the lower section 225 opposite the tee 241.

The array 235 includes two rows 247 and 249 of $2\frac{7}{8}$ inch O.D. hollow, perforated, cylindrical elements 251 and 253 with centers on a triangular pitch. The elements 251 and 253 in each row are spaced $4\frac{1}{2}$ inches center-to-center. The elements and the partition 255 are about 1 foot long. The tubing of which the elements are composed is commercial polypropylene rigid perforated tubing supplied by Conwed Corporation, Product No. RN5640, with $\frac{1}{4}$-inch$\times\frac{1}{8}$-inch rectangular openings and an open area of about 54%. Cylindrical elements 251 and 253 are located in a 9-inch wide assembly, which necessitated half cylinder elements 253 at the walls. The walls thus served as both containing outside walls as well as parallel partitions, inasmuch as the walls passed through the centerline of the outside semi-cylinders 253 in the first row. The second row was comprised of two cylinders, and a $\frac{1}{4}$-inch thick partition 255 was inserted equidistant from these cylinders, and splitting the first row center cylinder. The array 235 has a cross-sectional rectangular flow area of 9 inches$\times$11 inches; the duct sections 223 and 225 have a flow area which is 12 inches$\times$12 inches square.

Tests were conducted with air flowing vertically upwardly and liquid spraying countercurrent downwardly from above the array or cocurrent upwardly from below the array or in both directions. Air was supplied through the tee 241 in the 12-inch square vertical duct section 225 by a Cincinnati Size 15 centrifugal blower 243, equipped with a 7.5 HP motor. Liquid drained from the section 225 to a small tank 252 and was recycled by means of an Oberdorfer centrifugal pump 254 to one of the two spray nozzles 232 or 233 located 12 inches above and below the array 235. The top nozzle 232 was used for countercurrent liquid spray testing, and the bottom 233 for cocurrent liquid spray. Air flow was controlled by a slide damper (not shown) on the suction side of the blower 243. Air velocities were determined by pitot tube (not shown) measurements.

The objective of the investigation was to determine if the partition-buffle/sieve cylinder array 235 could be made to yield dynamic liquid retention in the cylinders 251, 253 and if, and, under what conditions, gas-bubbling would occur in the cylinders. Stable bubbling within the cylinders 251, 253 was achieved over linear gas velocities from 700 to 1450 feet/minute, for both countercurrent and cocurrent liquid spray condition, with equilibrium liquid drainage. For example, in one run, water spray was introduced below the array 235, cocurrent with air flow at a rate of 1.6 GPM. The air velocity through the module was varied in steps from 540 feet/minute to 1800 feet/minute, while observing the flow mechanisms and measuring pressure drop. At 540 feet/minute, no bubbling was observed, and liquid holdup was minimal. At 720 feet/minute air velocity, liquid filled the tubes, and light, intermittent bubbling began within the top cylinders 251. Bubbling increased and remained vigorous and stable with all cylinders as the air velocity was increased to 1294 feet/minute. At this point, pressure drop across the array 235 was only 0.55 inches water column, and equilibrium liquid drainage was being maintained. As the air velocity was increased to 1450 feet/minute, the differential pressure across the top row 247 of cylinders was sufficient to initiate heavy entrainment, so that the liquid in the cylinders began to spray upwardly and bubbling action in these cylinders decreased. As gas velocity was increased above this magnitude, the array 235 flooded, i.e., the liquid could no longer drain against gas friction at the rate it was being introduced, and the column of air and liquid went into violet discontinuous plug flow of gas. This test was repeated for liquid flows of 2.7, 3.45, 4.2, 5.6, 6.0 and 6.45 GPM cocurrent. There were negligible effects of liquid load variation on the gas velocity required to initiate good bubbling action in the cylinders on the pressure drop, or on the gas velocity flood point.

The tests were repeated over the same liquid flow rate range and with the liquid countercurrent to gas flow from the spray nozzle 232 above the array 235. Although pressure drop was 0.25–0.5 inches water column higher, the bubbling action as a function of gas flow and flooding limits obtained with cocurrent flow were approximately the same. A third set of runs made with both cocurrent and countercurrent nozzles, equally splitting the liquid flow, gave results similar to the separate countercurrent and cocurrent liquid-gas flow condition.

The most impressive feature of the flow behavior was the visually-observed vigorous and stable liquid-gas bubbling and frothing action predominantly within the cylinder obtained at gas flow velocities many times higher than those used in conventional liquid-gas contacting devices such as bubble-cap trays or sieve-plates. In the form tested, the appartus of this invention is equivalent to a two-stage set of sieve trays rolled into cylindrical form. The resulting sieve-tube partitioned array (with the flow-parallel partitions) affords a uniquely new liquid-gas contacting device capable of operating at vigorous and stable contacting conditions, under very low pressure drops at ranges of linear gas velocity which were previously regarded as unattainable. Such apparatus has broad application to distillation and absorption equipment of very compact and economic sizes.

In carrying out the work described above in connection with FIGS. 8 and 9, it was realized that the effectiveness of this apparatus is limited by the liquid entrainment caused by the restricted flow of the gas and liquid after these fluids leave the array. FIGS. 10 through 13 show apparatus for materially improving the mass transfer by eliminating this deficiency.

Figure 10:
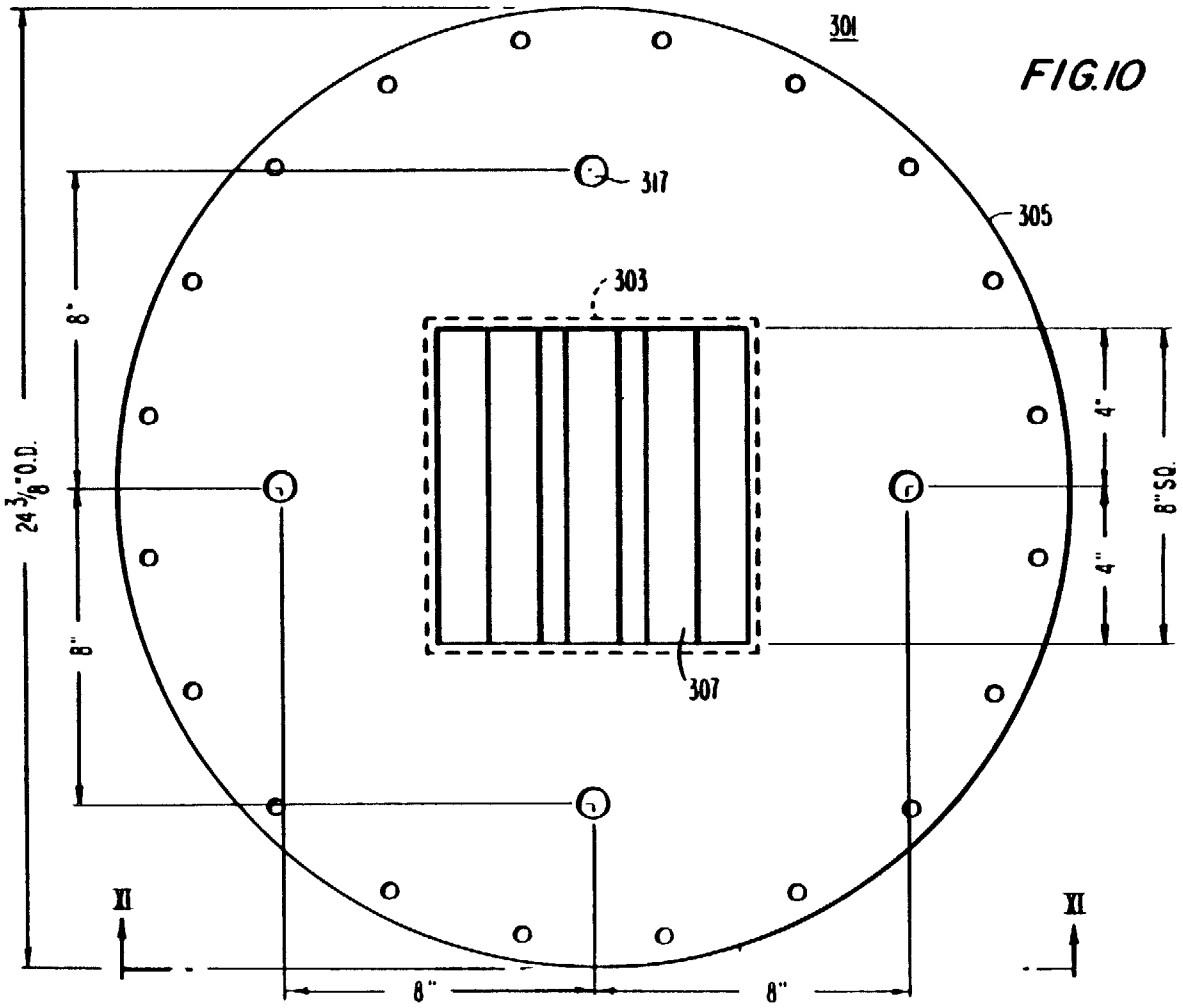
FIG. 10 is a plan view of a dynamic bubbler module in accordance with an aspect of this invention.
Figure 11:
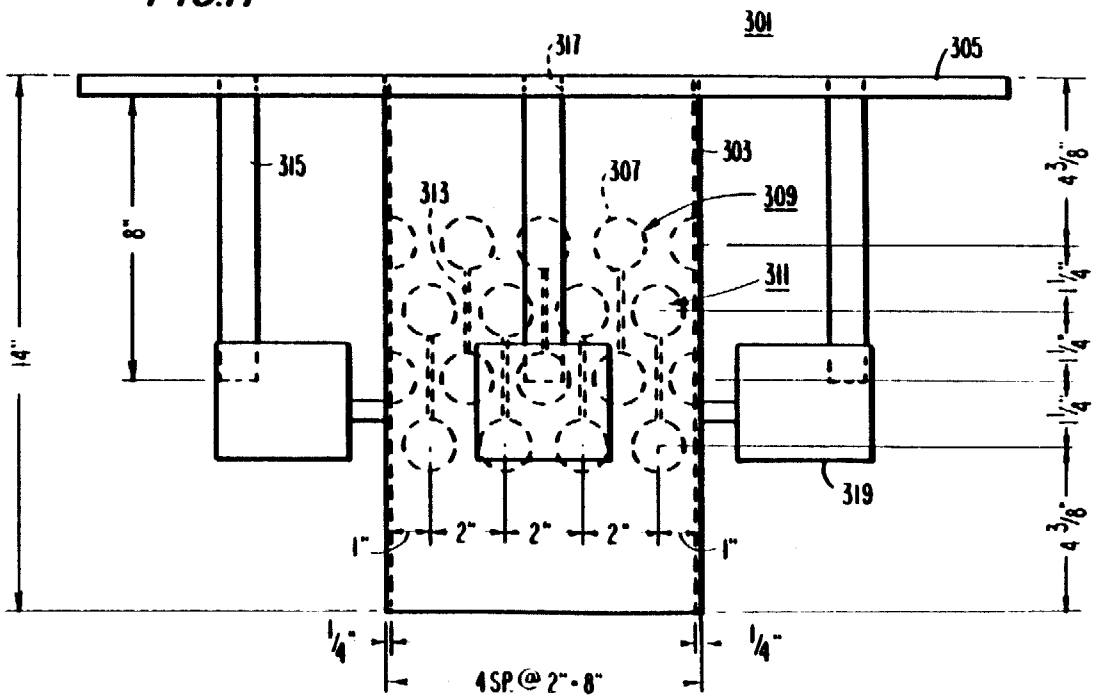
FIG. 11 is a view in side elevation taken in the direction XI—XI of FIG. 10.

FIGS. 10 and 11 show a bubbler tubular array unit or bubbler module 301 in accordance with this aspect of the invention. The module 301 includes a housing 303 of rectangular transverse cross-section open at the top and bottom. As shown by the dimensions, housing 303 is square. A plate or tray 305 extends from the top of the housing 301. Within the housing 303 a plurality of perforated tubes 307 are mounted. The tubes are arrayed in rows 309 and 311. The tubes 307 in each row 309 and 311 are staggered with respect to the tubes in adjacent rows 311 or 309. The housing 303 is generally vertical and the tubes 307 are generally horizontal. As in the case with the other modifications of this invention, partitions 313 extend between the tubes 307 of alternate rows. The partitions 313 are mounted generally vertically and are so positionally related to the tubes 307 as to suppress diagonal flow through the array. Specifically, in the module 301, the partitions 313 are joined, for example, by welding or by an adhesive to the tubes 307 between which they extend. The partitions 313 extend substantially along the whole length of the tubes 307. The tubes 307 of the rows 309 or 311 intervening between the alternate rows 311 or 309 between which each partition 313 passes are mounted generally symmetrical with respect to the partition, i.e., each partition bisects the shortest distance between the tubes between which it passes. The thickness of each partition is small compared to this shortest distance and it is shaped to minimize the resistance to the gas which flows upwardly through the housing. A plurality of downcomers 315 are suspended from the plate 305, each in communication with the top of the plate through an opening 317. A hydraulic seal cup 319 suspended from the downcomer 315 is in communication with the lower end of the downcomer 315. In the alternative the downcomer may be sealed against the gas by an overflow weir segment on the tray below.

As described, the elements of the array of the module 301 are perforated tubes or wire mesh or of foraminous material. The partitions 313 and the housing 303 are typically composed of polypropylene.

Figure 12:
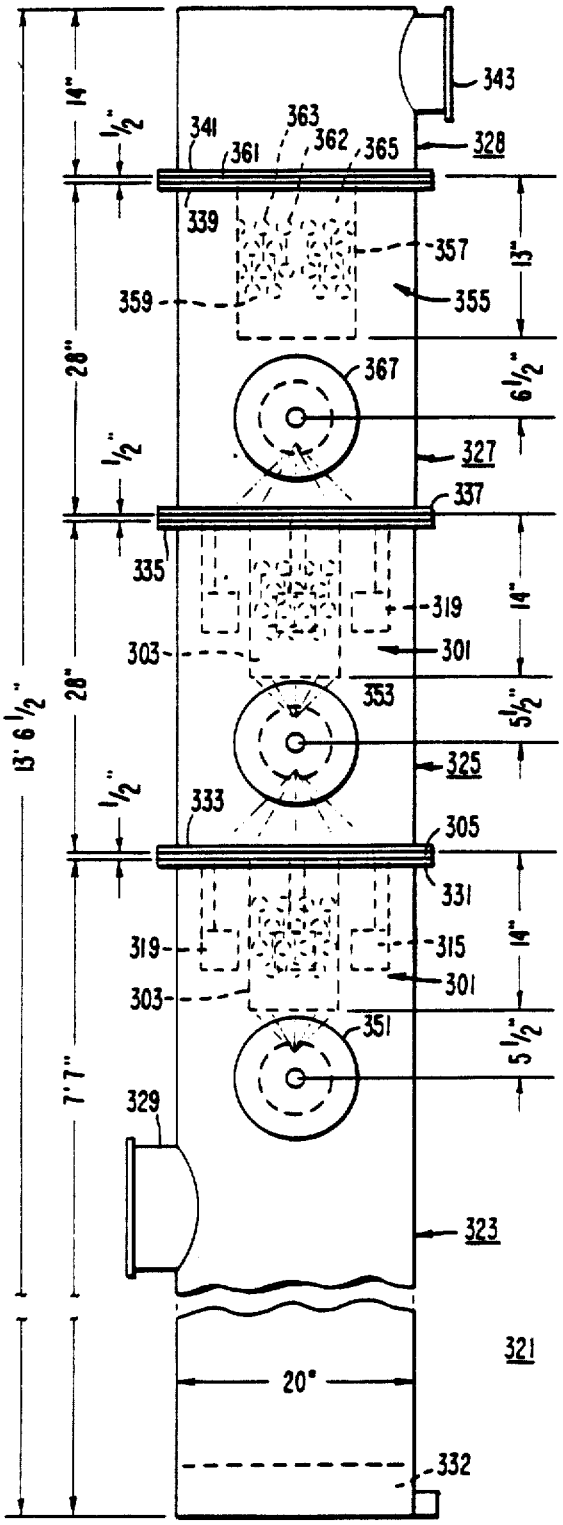
FIG. 12 is a view in side elevation, partly diagrammatic showing a tower for mass transfer in accordance with an aspect of this invention.

FIG. 12 shows a tower 321 for mass transfer. The tower 321 includes an outer circularly cylindrical shell composed of a plurality of sections 323, 325, 327 and 328. The lower section 323 includes an inlet fitting 329 for the gas to be treated and has a flange 331 at the top. At the bottom there is a sump 332. The section 325 has flanges 333 and 335 at the bottom and top and flange 327 has flanges 337 and 339 at the bottom and top. Section 328 has a section 341 at the bottom and is closed at the top. Section 328 also has an outlet fitting 343 for the treated gas.

Figure 13:
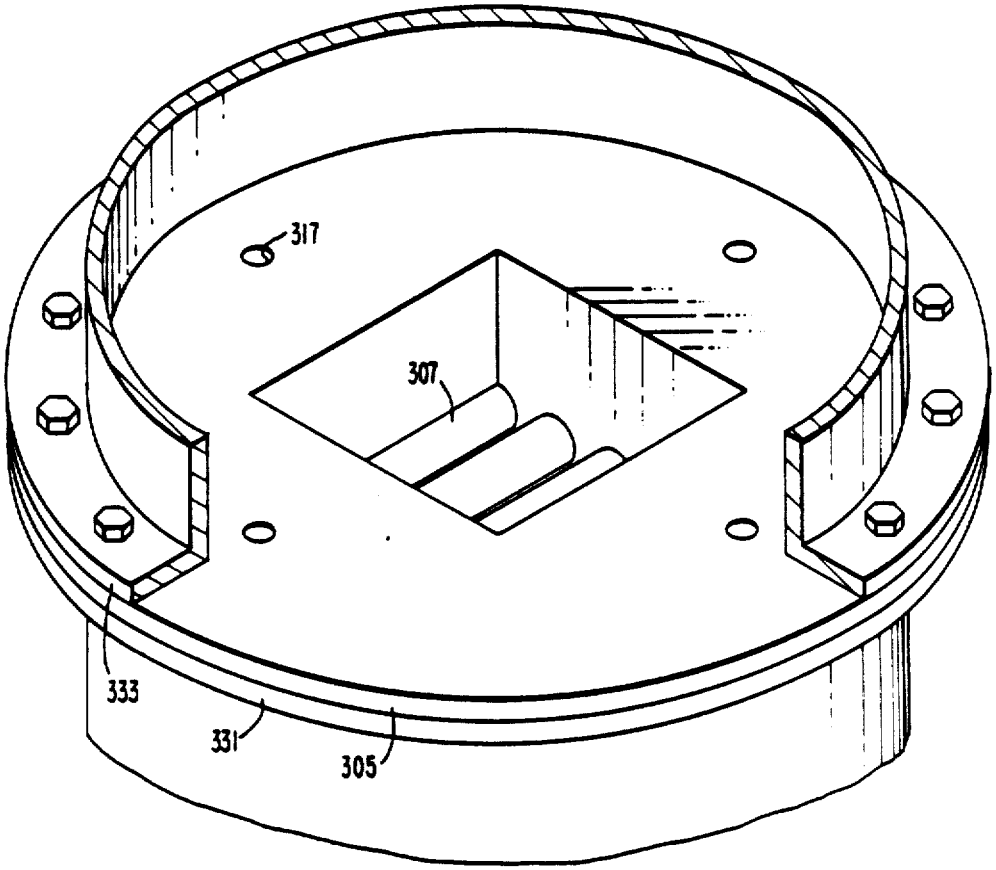
FIG. 13 is a fragmental isometric view showing how the parts of the tower of FIG. 12 are interconnected with each module.

A bubbler module 301 is suspended in the lower section 323. The flange 305 of the module 301 is secured by bolts between the flange 331 of the section 323 and the lower flange 333 of the section 325 (FIG. 13). Gaskets (not shown) are interposed between each flange 331 and 333 and the flange 305. A nozzle 351 is suspended from the box 303. The nozzle produces spray upwardly.

A bubbler module 301 is also suspended from section 325. This module is suspended in the same way as the module in section 323. The flange 305 of this module 301 is secured between the flange 335 of the section 325 and the flange 337 of the section 327 with gaskets. A spray nozzle 353 is suspended from the box 303 of this module. The spray 353 selectively produces sprays upwardly and/or downwardly.

A mist eliminator 355 is suspended from section 327. This mist eliminator 355 is similar to the module 301, except that the inside transverse cross-section of its housing 357 is 10 inches square. The reason for this increase in cross-section is to reduce the velocity of the gas flow through the mist eliminator so that it functions effectively to remove the mist. The mist eliminator has a plate 361 at the top. The housing 357 is open ended and within the housing a plurality of tubes 359 are arrayed in rows 362 and 363 with the tubes in alternate rows staggered. Partitions 365 extend between alternate rows along the whole lengths of the tubes and each is joined to the tubes 359 between which it extends. As in the case of module 301 (FIGS. 10, 11), the partition 365 and the box 357 may be composed of polypropylene and the tubes 359 of perforated polypropylene tubing such as "VEXAR". The mist eliminator 355 is suspended by its plate 361 which is secured between the upper flange 339 of section 327 and the flange 341 of section 328. The mist eliminator 355 has no downcomers like the downcomers 315 and its plate has no holes like the holes 317. A spray nozzle 367 is suspended from the box 357. The spray nozzle 367 produces spray downwardly, but not upwardly.

Only two sections 323 and 325 containing bubbler modules 301 are shown. In the practice of this invention, there may be any required number of such sections.

In the use of the tower 321, the gas whose contaminants or other content is to be separated is injected through fitting 329 and flows upwardly through the sections 323, 325 and 327. Liquid spray is introduced into the gas as required by the nozzles 351, 353 and 367. Depending upon the control of the nozzles, the spray may flow cocurrent or countercurrent to the gas. The gas is supplied at high enough velocity to produce stable dynamic pools in the tubes 307 of the modules 301 and in the tubes 362 of the mist eliminator 355. The gas bubbles through the liquid pools within the tubes of modules 301 and mass interchange takes place. The treated gas which leaves the lowermost module 301 expands into the space above the plate 305 and its velocity is reduced. Liquid drops which have been entrained in the array drop out on the plate 305 coalesce and the resulting liquid runs into downcomers 315. The downcomers deposit the liquid into cup 319. The overflow from the cups is deposited in sump 332. The gas treated by bubbler module 301 in section 325 also expands above the flange 305. The collected liquid entrainment from plate 305 of the module in section 325 overflows cup 319. This overflow is deposited partly into the array of the lowermost module where it is reentrained by the upflowing gas. In part, this liquid is deposited on plate 305 and runs out of downcomers 315 of the lower-most module and then through cups 319 into sump 332.

The operation of a tower with perforated (VEXAR) tubes 307 in the modules 301 in accordance with this invention was compared with the operation of a tower with imperforate tubes. The operation of the tower with the imperforate tubes was unsatisfactory, while the performance of the tower with the perforate tubes was highly satisfactory.

The internal hollow perforated tube bubbler embodiment of this invention shown in FIG. 12 may be employed as a multi-stage gas-liquid contacting column for mass-transfer applications, such as distillation, gas absorption, stripping and the like, at gas velocity ranges heretofore unachievable. In addition to the bubbling contact action taking place predominantly within the tubes, a greater degree of droplet or spray contact is obtained in the disengaging space between trays than is normally found in conventional sieve and bubble-cap plate columns. This is caused by the higher gas velocities allowed by the arrays of this invention, which induces a greater rate and degree of entrained liquid spray off the tray.

In a multi-stage contacting tower (FIG. 12) analogous to a distillation tower, any of the numerous conventional liquid downcomer and overflow weir arrangements may be employed to secure liquid countercurrent flow through the column, as well as crossflow across each contact stage. Such downcomer and weir arrangements are described in standard texts such as "Distillation" by Matthew Van Winkle, McGraw-Hill Book Company. The contact stages where gas-liquid contacting takes place are the bubbler arrays as described above. The trays or plates includes in the bubbler arrays may be secured within the tower by means of flanging individual sections of the column as described with reference to FIG. 12 or, in cases where an integral tower shell is required as for pressure or vacuum applications, by more conventional means such as internal support rings, seal rings, and the like.

It is also within the scope of equivalents of this invention to have more than one bubbler tube assembly and housing contained on a contact tray. It is also with the scope of equivalents of this invention to introduce the liquid into the bubbler by a number of different means. When the bubbler assembly is appended below the tray, one such means is to allow overflow of the liquid into the top row of the array either from the plane of the tray or from an overflow weir on the tray. When the bubbler assembly is mounted on top of the horizontal plate, liquid may be introduced into the bubbler array through openings located in the vertical walls of the bubbler array housing, in which case the housing walls also function as partial overflow weirs. The openings in the vertical housing walls allowing liquid to flow into the bubbler array from the horizontal plate may correspond to the centerlines of a row of tubes, preferably the bottom row. In this case, the liquid flows from the horizontal plate to the inner portion of the bottom tubes and is aspirated upwards by the gas venturi action as it discharges from within the tubes.

Where multiple bubbler assemblies are mounted on a tray, cross-flow tray gradients in liquid hydraulic flow and concentration may be secured by conventional weir arrangements well known to the art. For example, where two bubbler assemblies are located on a tray, and the downcomers from the tray above to the tray below are located at opposite sides or sections of the tray, then one or more overflow weirs placed normal to the direction of liquid crossflow on the tray may serve to provide a desired tray gradient. In the present invention, the on-tray gradient weirs may be placed either between bubbler assemblies or appended to their housing walls.

While preferred embodiments of this invention have been disclosed herein, many modifications thereof are feasible. This invention is not to be restricted, except insofar as is necessitated by the spirit of the prior art.

I claim:

1. Apparatus for treating fluids for liquid-gas contacting, for removing particulate, mist or fumes from fluids, or for transferring heat or mass between fluids, the said fluids flowing predominantly in a predetermined direction, the said apparatus including separate cylindrical elements arrayed in a plurality or rows, each said element being impermeable to the flowing fluids, *the elements in* said rows being transverse to said predetermined direction, and the elements of adjacent rows being staggered with [reference] *respect* to each other, the elements of each row being spatially separated from each other and from the elements of adjacent rows, so that an open flow space would normally surround each element, whereby there would normally undesirably be by-pass channels permitting by-pass flow for the fluids between the elements along the rows [at an angle] *diagonally* to said predetermined direction; the said apparatus being characterized by that said elements have non-reentrant surfaces on their upstream side with respect to the direction of flow of said fluid and further characterized by that said by-pass flow of said fluid is prevented by partitions bridging between at least a plurality of pairs of certain of said elements, the elements of each said [bridging] *bridged* pair being in alternate rows, and the elements of intervening rows being positioned generally symmetrically with respect to said partitions, said partitions being substantially in contact with the surfaces of the elements which they bridge along the length of said elements to interpose substantially complete obstruction to said by-pass flow, *there being no row from the surfaces of whose said elements more than one said partition extends,* said partitions being positioned [transversely] *generally parallel* to said predetermined direction and being so shaped so as to minimize the pressure drop in the fluids flowing through said apparatus.

2. The apparatus of claim 1 wherein each partition passes between a pair of elements of an intervening row and the thickness of said each partition is small compared to the minimum distance between the outer surfaces of said pair of elements which surfaces bound the space through which said each partition passes.

3. The apparatus of claim 2 wherein the thickness is 5 to 25% [and preferably 5 to 15%] of the minimum distance.

4. Apparatus for treating fluids, for liquid-gas contacting for removing particulate, mist or fumes from fluids, or for transferring heat or mass between fluids, the said fluids flowing predominantly in a predetermined direction, the said apparatus including separate cylindrical elements arrayed in a plurality of rows, the elements of each row spatially separate from each other and from the elements of adjacent rows so that open flow space would normally completely surround each element, each said element being imperforate to the flowing fluids, said *elements in said* rows being transverse to said predetermined direction, the elements of adjacent rows being staggered with respect to each other, the said apparatus being characterized by elements whose surfaces are non-reentrant on their upstream side with respect to the direction of flow of said fluid and by the suppression of by-pass flow diagonally of said rows, by partitions, the said partitions being interposed between at least a plurality of pairs of elements, the said elements of each said pair being in alternate rows, each said partition being substantially in contact with the surfaces of the element between which it extends along the length of said elements to prevent said diagonal by-pass flow, *there being no row from the surfaces of whose said elements more than one said partition extends,* each said partition being generally parallel to said direction and being shaped so as to minimize the pressure drop in said fluid flowing through said apparatus.

5. Apparatus for treating fluids for liquid-gas contacting, for removal of particulate, mist or fumes from fluids, or for transferring heat or mass between fluids, the said fluids flowing predominantly in predetermined directions, the said apparatus including separate cylindrical elements, each said element being permeable to fluid flow throughout its entire active surface, said elements being arrayed in a plurality of rows in which said elements are spatially separated from each other and the elements of each row are spatially separated from the elements of adjacent rows so that an open flow space would normally surround each element, whereby there would normally undesirably be by-pass channels for the fluid along the rows at an angle to said directions, resulting in by-pass flow at said angle; *the elements in* each said row being generally perpendicular to said predetermined directions, the said elements of adjacent rows being staggered with respect to each other, the said apparatus being characterized by that said by-pass flow is prevented by partitions bridging between at least a plurality of pairs of certain of said elements, the elements of each said bridged pair being in alternate rows, and the elements of the intervening rows being positioned generally symmetrically with respect to said partitions, each said partition being substantially in contact with the outer [surface] *surfaces* of the elements which it bridges along the length of said [each element] *bridged elements* without penetrating through said *bridged* elements to interpose substantially complete obstruction to flow of fluids in said by-pass channels, *there being no row from the surfaces of whose said elements more than one said partition extends,* said partitions being generally parallel to said predetermined [direction] *directions* and being shaped so as to minimize the pressure drop in the [fluid] *fluids* flowing through said apparatus.

6. The apparatus of claim 5 wherein each partition passes between a pair of elements of an intervening row and the thickness of said each partition is small compared to the minimum distance between the outer surfaces of said pair of elements, which surfaces bound the space through which said each partition passes.

7. The apparatus of claim 6 wherein the thickness is 5 to 25% [and preferably 5 to 15%] of the minimum distance.

8. Apparatus for removing particulate from a gas, the said apparatus including a plurality of separate cylindrical elements, each element being perforated throughout its entire active surface, said elements being arrayed in rows spatially separated from each other with each element in each row spatially separated from the other elements of said each row so that open flow space would normally surround *each* said element, the elements of adjacent rows being staggered with respect to each other, a partition bridging between a plurality of pairs of certain of said elements, the elements of each said bridged pair being in alternate rows and being interposed between pairs of elements of the rows intervening between said alternate rows, each said partition being substantially in contact with the surfaces of the elements which it bridges along the length of said [each element] *bridged elements* to prevent diagonal flow through said rows, *there being no row from the surfaces of whose said elements more than one said partition extends,* whereby constricted flow channels are formed between each partition and the elements of the intervening rows between which it is interposed, means for transmitting said gas through said elements in a direction generally perpendicular to *the elements in* said rows, and means for injecting a liquid into said gas producing liquid drops in said gas, the said elements and partitions being so spaced with respect to each other that said constricted flow channels function as venturi passages and a multple venturi effect acts on said gas, particulate and liquid drops as they pass through said constricted flow channels and they are accelerated to higher velocities, the velocity of said particulate in said constricted channels being higher than the velocity of the drops of said liquid, whereby said drops capture said particulate.

9. The method of removing particulate from a gas with apparatus including a plurality of cylindrical elements, each said element being imperforate to said gas, *said elements being* arrayed in rows with the elements of adjacent rows staggered with respect to each other[,] *and* with each element physically separate from the elements of its row and *from the elements in* adjacent rows, and with partitions extending between the elements of alternate rows, each said partition being substantially in contact with the surfaces of the elements between which it extends along the length of said [each element to prevent] *elements between which it extends, said partitions preventing* diagonal by-pass flow through said rows, each of said partitions being interposed between a pair of elements of rows intermediate said alternate rows, *there being no row from the surfaces of whose said elements more than one said partition extends,* each element *of a said pair* and its adjacent partitions defining channels for the flow of gas, each channel being bounded by the continuous curvilinear surface of a said [cylindrical] *each* element *of a said pair* and a said adjacent partition, *each said channel* decreasing gradually in width from a first distance constituting a part of the distance between a pair of adjacent of said adjacent partitions to a second substantially smaller distance between said each element *of said pair* and one of said adjacent partitions and then gradually increasing in width from said smaller distance to a distance constituting a part of the distance between said adjacent partitions, the said first distance and the said second distance being so related [to] *that* an effective venturi effect for a gas flowing through said each channel is present; the said method comprising injecting a liquid into said gas to produce drops of liquid in said gas, [passing] said liquid drops, gas and particulate forming a fluid, *passing said fluid* through said channels defined by said rows of elements and their associated partitions generally transverse to said rows thereby to accelerate said drops of the liquid[, ] *passing through* said each channel from the region of said first distance through the region of said second distance, at a lower rate than the particulate *passing from the region of said first distance through the region of said second distance* is accelerated, whereby said liquid drops are at a lower velocity than said particulate and said particulate collides with said drops and is captured by its collision with said drops.

10. Gas liquid contacting apparatus for transferring components [in] *between* a liquid [to] *and a* gas, the said apparatus including a unit having (a) a plurality of separate cylindrical elements, each said element being perforate throughout its entire active surface, the elements being arrayed in rows, the elements in each row being spatially separated from each other and from the elements of adjacent rows so that open flow space would normally completely surround each element, and (b) partitions bridging pairs of certain of said elements, the elements of each said bridged pairs being in alternate rows, each partition being substantially in contact with the outer surfaces of the elements which it bridges along the length of said each bridged [elements] *element* without penetrating through said *each* bridged [elements to suppress] *element, there being no row from the surfaces of whose said elements more than one said partition extends, said partitions suppressing* diagonal by-pass flow through said rows, means for transmitting a gas through said unit in a direction generally transverse to said rows, and means, downstream of the most downstream row of said unit with respect to the flow of said gas, for transmitting a liquid to said unit in countercurrent relationship to said gas, said gas having a flow velocity within a range such that said transmitted liquid is held up within said elements in a stable pool and said gas bubbles through said pool.

11. The method of liquid-gas contacting for mass interchange with an array of generally horizontal cylindrical elements, each element being perforated throughout its entire active surface, said elements being disposed in rows in said array with the elements in alternate rows staggered with respect to the elements of the intervening rows, each element being physically disconnected from the elements of its row and from the elements of adjacent rows, *and with* partitions extending between pairs of elements in alternate rows, each said partition being substantially in contact with the outer surface of the elements between which it extends along the length of said [each element] *elements* between which it extends, without penetrating through said last-named elements, [to suppress] *there being no row from the surfaces of whose said elements more than one said partition extends, said partitions suppressing* diagonal by-pass flow of fluids through said array, the said method comprising conducting a gas and a liquid between which mass interchange is to take place generally vertically through said array with said gas flowing generally vertically upwardly, said gas flowing at a velocity such as to produce stable dynamic pools of the liquid within said elements, interacting the gas and liquid by bubbling the gas through said pools to produce the mass interchange between the content of said gas and said liquid, and conducting the thus interacted gas and the thus interacted liquid separately away from said array.

12. The method of claim 11 wherein the velocity of the gas emerging from said array is reduced so that reentrained liquid is removed from said gas and the thus removed liquid is conducted away.

13. A bubbler for mass transfer between a generally vertically flowing gas and a liquid in the stream of said gas to interact with each other, the said bubbler including a container having a top plate and also having therein a plurality of generally horizontal separate tubular elements, the walls of each element being perforated, the said elements being disposed in a vertical array of rows with the elements in alternate rows staggered, with respect to the elements in intervening rows, each element being physically disconnected from the elements in its row and from the elements in adjacent rows so that normally each element would be surrounded by an open flow space, a plurality of generally vertical partitions, each partition extending between at least certain of corresponding pairs of elements in alternate rows and passing between the staggered elements of the intervening row, said each partition being so positionally related to the elements between which it extends as to block diagonal by-pass flow of fluid along the elements from which it extends, the said top plate of said container extending beyond said array, and at least one downcomer extending from said top plate in communication with its outer surface to drain liquid deposited on said surface.

14. The bubbler of claim 13 wherein each partition is joined to the elememts between which it extends.

15. A tower for mass transfer between a gas and a liquid, the said tower including a plurality of bubblers arrayed in series generally vertically within said tower, each said bubbler including (a) a container having a top *plate* extending generally horizontally beyond the boundaries of said container, (b) a plurality of generally horizontal separate tubular elements within said container, the wall of each said element being perforated, the said elements being disposed in a vertical array of rows with the elements in alternate rows staggered with respect to the elements in intervening rows, each element being physically disconnected from the elements in its row and from the elements in adjacent rows so that normally each element would be surrounded by an open flow space, (c) a plurality of generally vertical partitions, each partition extending between a pair of elements in alternate rows and passing between staggered elements of the intervening row, each partition being so positionally related to the said elements between which it extends as to obstruct diagonal flow along the last named elements, and (d) at least one downcomer extending from said [cover] *top* plate externally of said array, means, connected to said tower, for conducting a gas vertically upwardly through said serially arrayed bubblers in said tower, and means within said tower for injecting a liquid into said gas to interact with said gas, the said downcomer of each bubbler conducting liquid collected on the *top* plate of said each bubbler and conducting said liquid to the bubbler just below said each bubbler for recirculation.

16. The method of mixing at least a first fluid and a second fluid with apparatus including a plurality of separate cylindrical elements arrayed in rows with each row spatially separated from the rows adjacent to said each row and each element in each row spatially separated from the elements adjacent to said each element in said each row, the elements in each row being staggered with respect to the elements in rows adjacent to said each row, said apparatus also including partitions extending between the elements of alternate rows, each said partition being substantially in contact with the outer surfaces of the elements between which said each partition extends along the length of said [each element] *elements between which said each of said partitions extends* without penetrating through said elements, *there being no row from the surfaces of whose said elements more than one said partition extends*; the said method including transmitting said first fluid through said array, transmitting said second fluid through said array, said transmitted first and second fluids forming a main stream, and mixing said fluids (a) by separating the main stream of said fluids into pairs of separate substreams, each pair of substreams being produced by the interposition in said main stream of each partition and the elements immediately downstream and upstream of said each partition in the row intervening between the alternate rows between whose elements said last-named each partition extends, and (b) by the recombination of each said pair of sub-streams downstream of said each partition and said downstream intervening elements.

17. The method of claim 16 wherein the first fluid is initially injected as a first stream into the array and thereafter the second fluid is injected into said first stream to form the main stream with said first stream.

18. The method of removing contaminants from a gas with apparatus including a plurality of sets of cylindrical elements, each set being arrayed in a row so that the elements are arrayed in a matrix with the elements in alternate rows staggered and partitions bridging between at least certain of the elements in alternate rows, each of said partitions being substantially in contact with the outer surface of the elements between which said each partition bridges along the length of said [each element] *bridged elements* without passing through said elements, *there being no row from the surfaces of whose said elements more than one said partition extends*; the said method comprising transmitting the gas in a stream generally perpendicular to the [of elements] *axes of the elements in the* rows, injecting a liquid as a spray into said stream, *repeatedly increasing and decreasing the velocity of said stream including said gas and the drops of said spray as said stream passes through the matrix* by means of a plurality of communicating venturi channels formed between each said partition and the elements of the row *intervening between the elements of said alternate rows* between which said each partition passes, each said channel being bounded by the surface of said each partition on one side and the curvilinear surface of one of said elements *intervening between the elements of the alternate rows* between which said each partition passes on the opposite side, [repeatedly increasing and decreasing the velocity of said stream including said gas and the drops of said spray as said stream passes through the matrix] thus repeatedly introducing differences between the velocity of said drops and the velocity of the contaminants in said gas and enhancing the capture of said contaminants by said drops, and capturing the drops containing the contaminants on the elements, the velocity of said stream being both increased and decreased gradually at a rate determined by the boundary of said each said channel thereby introducing gradually varying differences, in accordance with said rate, between the velocity of said drops and the velocity of the contaminants in said gas and effectuating the capture of said contaminants by said drops.

19. Apparatus for removing particulate from a gas including a plurality of cylindrical elements disposed in rows in an array through which said contaminant-containing gas is to be conducted with the elements of adjacent rows staggered with respect to each other, with each said element physically separate from the elements of its rows and from the elements of adjacent rows, and with partitions, each extending between a first pair of elements in alternate rows, each said partition being substantially in contact with the outer surfaces of the elements between which it extends along the [length] *lengths* of said [each element] *elements between which it extends* without penetrating through [the] *said last-named* elements [to prevent] *there being no row from the surfaces of whose said elements more than one said partition extends, said partitions preventing* diagonal by-pass flow of said gas through said array, each said partition being interposed between a second pair of elements of [rows] *a row* intermediate the associated rows of the elements between which said *last-named* each said partition [is interposed] *extends*, means for injecting a liquid into said gas to be conducted through said array , [so that] said gas, said particulate, and drops of said liquid forming a fluid [are] to flow through said array, each element of said second pair and its adjacent partitions forming channels for the flow of said fluid, each said channel being bounded by the curvilinear surface of an element of said second pair on one side and by [one of] *a* said [partitions] *partition* adjacent to said last-named element on the opposite side, each said channel decreasing in width gradually as determined by its said boundaries between a first distance upstream with respect to the direction of flow of said fluid, and a second substantially smaller distance downstream from said first distance with respect to the direction of flow of said fluid and then increasing in width gradually, as determined by the boundaries of said channel between said second distance and a third substantially larger distance, said first and third distance each being the maximum distance between the surface of the partition which forms a boundary *of* said channel and said curvilinear surface of said adjacent element which forms the opposite boundary of said channel, and said second distance being the shortest distance between said curvilinear surface and said last-named partition, the said first and third distances and the said second distance being so related that an effective venturi effect exists for said fluid through said each channel, whereby as said fluid passes through said channel, it is [gradually] accelerated gradually at a rate determined by the boundaries of said channel as it passes through said channel towards the region of said second distance and is decelerated gradually as determined by said boundaries of said channel as it passes out through said channel away from the region of said minimum distance so that during acceleration said drops are accelerated at a lower rate than said particulate and during deceleration said drops are decelerated at a lower rate than said particulate so that differences of velocity are induced between said particulate and said drops and said drops capture said particulate.

*20. A mist eliminator for eliminating mist from a mist-laden gas flowing in a generally horizontal direction; said mist eliminator including separate elongated cylindrical elements each positioned with its long axis generally vertically in a plurality of rows forming an array into which said fluid is to be injected, each said element being non-reentrant on its upstream side with respect to the direction of flow of said gas, the elements of adjacent rows being staggered with respect to each other, the elements in each row being spatially separate from each other and from the elements of adjacent rows so that an open flow space would normally surround each element, whereby there would normally undesirably be bypass channels permitting bypass flow for said gas at an angle to the horizontal direction in which said gas is injected into said array; the said mist eliminator being characterized by that said bypass flow of said gas is suppressed by partitions bridging between at least a plurality of pairs of certain of said elements, the elements of each of said bridged pair being in alternate rows of said array, and the elements in the intervening rows being positioned generally symmetrically with respect to said partitions, said partitions being substantially in contact with the elements which they bridge along the lengths of said elements to interpose substantially complete*

*obstruction to said bypass flow, there being no row from the surfaces of whose said elements more than one said partition extends, said partitions being positioned generally parallel to the direction of flow of said gas as it is injected in said array and being so shaped as to minimize the pressure drop of the gas flowing through said mist eliminator.*

*21. The mist eliminator of claim 20 wherein the cylindrical elements are impermeable to the gas.*

* * * * *